United States Patent
Nakagawa

(10) Patent No.: US 8,944,124 B2
(45) Date of Patent: *Feb. 3, 2015

(54) PNEUMATIC TIRE FOR A MOTORCYCLE

(75) Inventor: Hidemitsu Nakagawa, Saitama (JP)

(73) Assignee: Bridgestone Corporation, Tokyo (JP)

( * ) Notice: Subject to any disclaimer, the term of this patent is extended or adjusted under 35 U.S.C. 154(b) by 400 days.

This patent is subject to a terminal disclaimer.

(21) Appl. No.: 13/203,399

(22) PCT Filed: Feb. 22, 2010

(86) PCT No.: PCT/JP2010/001142
§ 371 (c)(1),
(2), (4) Date: Sep. 26, 2011

(87) PCT Pub. No.: WO2010/098060
PCT Pub. Date: Sep. 2, 2010

(65) Prior Publication Data
US 2012/0024446 A1    Feb. 2, 2012

(30) Foreign Application Priority Data
Feb. 26, 2009    (JP) .................. 2009-044581

(51) Int. Cl.
*B60C 1/00*     (2006.01)
*B60C 11/00*    (2006.01)
(52) U.S. Cl.
CPC ............. *B60C 11/00* (2013.01); *B60C 11/0058* (2013.04); *B60C 2200/10* (2013.04); *B60C 2011/0025* (2013.04)
USPC .................. 152/209.5; 152/209.11
(58) Field of Classification Search
CPC ............... B60C 11/0058; B60C 2011/0025; B60C 2200/10
USPC .......................... 152/209.5, 209.11
See application file for complete search history.

(56) References Cited

U.S. PATENT DOCUMENTS 8,297,324 B2 * 10/2012 Terada ............ 152/209.5
8,695,660 B2 * 4/2014 Nakagawa ........... 152/209.5
(Continued)

FOREIGN PATENT DOCUMENTS

JP    10-119513 A    5/1998
JP    2008-189040 A  8/2008
(Continued)

OTHER PUBLICATIONS

English machine translation of JP4231085, dated Feb. 2009.*
(Continued)

*Primary Examiner* — Justin Fischer
*Assistant Examiner* — Robert Dye
(74) *Attorney, Agent, or Firm* — Sughrue Mion, PLLC

(57) ABSTRACT

The present invention provides a pneumatic tire for a motorcycle which secures a sufficiently large lateral force in the intermediate region contacting the ground particularly when a middle camber angle is applied to the tire and increases a driving force and a braking force. The tire comprises a tread portion 1, side wall portions 2 and bead portions 3. This tread portion 1 comprises five regions of a central region A, shoulder regions C and intermediate regions B. Loss tangent of at least a portion forming a ground contact surface of an intermediate tread rubber 7b disposed over an entire region of the intermediate regions B is larger than both of loss tangent of at least a portion forming a ground contact surface of a central tread rubber 7a disposed over an entire region of the central region A and loss tangent of at least a portion forming a ground contact surface of a shoulder tread rubber 7c disposed over an entire region of the shoulder regions C.

6 Claims, 2 Drawing Sheets

(56) References Cited

U.S. PATENT DOCUMENTS

| | | | |
|---|---|---|---|
| 2007/0102083 A1* | 5/2007 | Hayashi | 152/209.5 |
| 2010/0200132 A1* | 8/2010 | Funahara et al. | 152/209.5 |

FOREIGN PATENT DOCUMENTS

| | | | |
|---|---|---|---|
| JP | 2008-189041 A | | 8/2008 |
| JP | 2008-302818 A | | 12/2008 |
| JP | 2009-029211 A | | 2/2009 |
| JP | 4231085 | * | 2/2009 |
| WO | 2008/093473 A1 | | 8/2008 |
| WO | 2009/013961 A1 | | 1/2009 |
| WO | 2009/025072 A1 | | 2/2009 |

OTHER PUBLICATIONS

International Search Report of PCT/JP2010/001142, dated May 18, 2010.

Chinese Office Action, dated Jun. 25, 2013, issued in corresponding Chinese Patent Application No. 201080017411.1.

Japanese Office Action, dated Feb. 5, 2013, issued in corresponding Japanese Patent Application No. 2009-044581.

Extended European Search Report issued in European Application No. 10745947.1 dated Jul. 30, 2012.

Chinese Office Action issued Jan. 24, 2014 in Chinese Patent Application No. 201080017411.1.

* cited by examiner

PNEUMATIC TIRE FOR A MOTORCYCLE

CROSS REFERENCE TO RELATED APPLICATIONS

This application is a National Stage of International Application No. PCT/JP2010/001142 filed Feb. 22, 2010, claiming priority based on Japanese Patent Application No. 2009-044581, filed Feb. 26, 2009, the contents of all of which are incorporated herein by reference in their entirety.

TECHNICAL FIELD

The present invention relates to a pneumatic tire for a motorcycle.

RELATED ART

In order for a motorcycle to run in a corner, a camber angle should be applied to a tire for the motorcycle, by which the tire is tilted with respect to a road surface in contrast to a tire for a so-called four-wheel vehicle such as a passenger car, a bus and a truck, which runs in a corner with a slip angle being applied to the tire. Therefore, in a tire for a motorcycle a ground contact region of a tread portion in straight running will be different from that in cornering.

That is to say, a central region of a tread portion of the tire including a tire equatorial plane contacts a road surface in straight running of the motorcycle to function to transmit a driving force and a braking force to the road surface while a shoulder region including a tread ground contact end contacts a road surface in cornering to function to generate a lateral force against a centrifugal force applied to the motorcycle. An intermediate region located between these regions functions to transmit a driving force and a braking force to a road surface for example in the end of a corner or the like and to generate a lateral force against a centrifugal force in cornering.

Therefore, if a tread rubber disposed in a ground contact region of a tread portion of a tire for a motorcycle comprises a single kind of rubber or has a single kind of rubber hardness and the like, it is impossible to sufficiently achieve the above-mentioned functions in each of the ground contact regions.

For example, patent document 1 describes a pneumatic tire for a motorcycle aiming to improve high-speed durability especially in straight running by dividing a tread portion into at least four tread regions each comprising rubber having different loss tangent from that of rubber of the adjacent region as viewed in the cross section taken along a tire meridian and by setting loss tangent of rubber of the central region which is a tread region including the tire equatorial plane among the tread regions being lower than loss tangent of rubber of other tread regions.

In addition, patent document 2 describes a pneumatic tire for a motorcycle aiming to improve straight running performance and turning performance by setting loss tangent of a tread rubber of the intermediate region being larger than loss tangent of a tread rubber of the central region and lower than loss tangent of a tread rubber of the shoulder region.

However, in a pneumatic tire for a motorcycle described in these patent documents 1 and 2, not only a driving force and a braking force are still insufficiently transmitted to a road surface but also a lateral force against a centrifugal force is still insufficiently generated, which are required for the intermediate region between the central region and the shoulder region, which contacts a road surface especially in the end of a corner or the like in cornering.

[Patent document 1] JP2008189040
[Patent document 2] JP10119513

DISCLOSURE OF THE INVENTION

Problems to be Solved by the Invention

Therefore, the present invention provides a pneumatic tire for a motorcycle which secures a sufficiently large lateral force in the intermediate region contacting the ground particularly when a middle camber angle is applied to the tire and increases a driving force and a braking force.

Means for Solving the Problem

A pneumatic tire for a motorcycle according to the present invention comprises a tread portion comprising a tread rubber having a layered structure of one or more layers, a pair of side wall portions continuously extending from each side of the tread portion inward in a radial direction of the tire and bead portions each continuing into a radially inner side of each of the side wall portions, wherein a ground contact region of the tread portion comprises five regions of: a central region including a tire equatorial plane; a pair of shoulder regions each including a tread ground contact end; and a pair of intermediate regions each located between the central region and each of the shoulder regions, and loss tangent of at least a portion forming a ground contact surface of an intermediate tread rubber disposed over an entire region of the intermediate regions is larger than both of loss tangent of at least a portion forming a ground contact surface of a central tread rubber disposed over an entire region of the central region and loss tangent of at least a portion forming a ground contact surface of a shoulder tread rubber disposed over an entire region of the shoulder regions.

The term "tread rubber having a layered structure of one ore more layers" as used herein includes not only a tread rubber of the tread portion comprising a single layer but also a tread rubber comprising multiple layers such as a cap and base structure.

Loss tangent as used herein means a value obtained as tans $\delta=E''/E'$ by measuring dynamic storage modulus $E'$ and dynamic loss modulus $E''$ under the condition of a temperature of 60° C., a distorted amplitude of 1% and a frequency of 52 Hz in accordance with JIS K7198.

In such a tire, loss tangent of the shoulder tread rubber is preferably larger than loss tangent of the central tread rubber.

In addition, loss tangent of the intermediate tread rubber is preferably within a range between 0.3 and 0.7.

Loss tangent of the central tread rubber is more preferably within a range between 0.2 and 0.6 and loss tangent of the shoulder tread rubber is preferably within a range between 0.25 and 0.65.

In a cross-sectional view taken along a tire meridian, a periphery length of an outer surface of the intermediate tread rubber is preferably within a range between 10% and 40% of a periphery length of an entire of the ground contact region.

The periphery length as used herein means a length measured along the tread surface in the meridian direction when a tire is mounted on a rim regulated by industrial standards effective in the areas where the tire is manufactured or used, such as JATMA (Japan Automobile Tyre Manufacturers Association, Inc.) Year Book in Japan, ETRTO (European Tyre and Rim Technical Organisation) STANDARD MANUAL in Europe, TRA (THE TIRE and RIM ASSOCIATION INC.) YEAR BOOK in the United States and the like and inflated with the maximum pressure according to a tire size regulated also in JATMA and the like.

In a cross-sectional view taken along a tire meridian, a periphery length of an outer surface of the central tread rubber is more preferably within a range between 10% and 35% of a periphery length of an entire of the ground contact region and a periphery length of an outer surface of the shoulder tread rubber is more preferably within a range between 5% and 35% of the periphery length of the entire of the ground contact region.

In any one of the above-mentioned tires the side wall portion preferably has a mark indicating that the tire is for a rear wheel of a motorcycle.

Effect of the Invention

Generally, in a pneumatic tire for a motorcycle the central region contacting the ground in straight running needs property suitable for efficiently transmitting a driving force and a braking force to a road surface and the shoulder region contacting the ground in cornering needs property suitable for generating a sufficient lateral force. In addition, the intermediate region of the tread portion located between both of those regions needs property not only for efficiently transmitting a driving force and a braking force to a road surface in the end of a corner or the like but also for generating a sufficient lateral force.

In a pneumatic tire for a motorcycle of the present invention, a ground contact region of the tread portion comprises five regions of a central region including the tire equatorial plane, a pair of shoulder regions each including a tread ground contact end and a pair of intermediate regions each located between the central region and each of the shoulder regions and rubber having the most suitable property depending on the required functions is disposed in each of these regions of the tread portion so that each region of the tread portion can effectively fulfill a function depending on the required performance.

Therefore, in the pneumatic tire for a motorcycle of the present invention, attention is focused on loss tangent of the tread rubber indicative of rubber viscoelasticity as a standard of a gripping force of the tire against a road surface for efficiently transmitting a driving force and a braking force.

By setting loss tangent of at least a portion forming a ground contact surface of the intermediate tread rubber being larger than both of loss tangent of at least a portion forming a ground contact surface of the central tread rubber and loss tangent of at least a portion forming a ground contact surface of the shoulder tread rubber, the intermediate region contacting the ground especially in the end of a corner, slalom running or the like on a dry road surface when a middle camber angle is applied can secure a high gripping force against a road surface so as to generate high braking and driving forces as well as a sufficient lateral force.

BEST MODE FOR CARRYING OUT THE INVENTION

Hereinafter, a pneumatic tire for a motorcycle of the present invention will be described in detail with reference to drawings.

Figure 1:
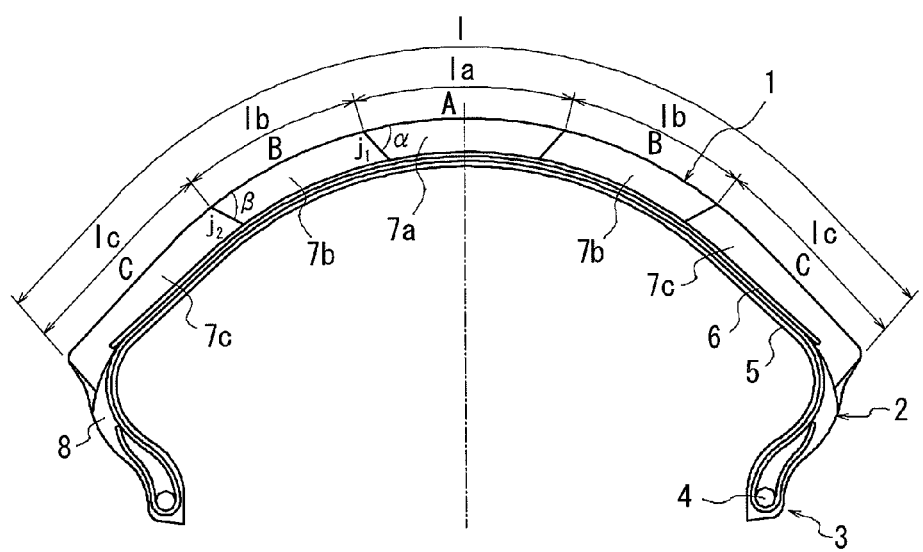
FIG. 1 is a cross-sectional view taken along a tire meridian showing one embodiment of a pneumatic tire for a motorcycle of the present invention.

FIG. 1 is a cross-sectional view taken along a tire meridian showing one embodiment of a pneumatic tire for a motorcycle of the present invention.

In FIG. 1 the reference numeral 1 denotes a tread portion, the reference numeral 2 denotes a pair of side wall portions continuously extending from each side of the tread portion 1 inward in the radial direction and the reference numeral 3 denotes bead portions each continuing into a radially inner side of each of the side wall portions 2.

The tire has a carcass ply 5 extending from the tread portion 1 through the side wall portion 2 and turned around a bead core 4 of the bead portion 3. Although a carcass consists of one carcass ply 5 in the figure, a carcass may consist of a plurality of carcass plies.

A belt 6 consisting of at least a circumferential reinforcing cord layer is disposed on the outer circumferential side of the carcass ply 5 in the crown region. This belt 6 may have a so-called spiral belt structure in such a manner that, for example, one or plural cords extending in the tire circumferential direction are spirally and continuously wound.

A tread rubber 7 extending between tire maximum width positions in an arc and forming a ground contact region of the tread portion 1 is provided on the further outer circumferential side of the belt 6. A side rubber 8 forming a side portion is provided in each side of the tread rubber 7.

In addition, predetermined grooves are formed on the surface of the tread rubber 7 though they are omitted in FIG. 1.

In the tire shown in the figure, the ground contact region of the tread portion 1 comprises five regions of a central region A including a tire equatorial plane, shoulder regions C each including a tread ground contact end and intermediate regions B each located between the central region A and each of the shoulder regions C. The shoulder regions C and the intermediate regions B respectively form a pair in symmetrical positions with respect to the equatorial plane.

The tread rubber 7 disposed in each region has a single layered structure. A periphery length la of an outer surface of a central tread rubber 7a disposed over an entire region of the central region A is set within a range between 10% and 35% of a periphery length l of an entire of the ground contact region. A periphery length lb of an outer surface of an intermediate tread rubber 7b disposed over an entire region of the intermediate region B is set within a range between 10% and 40% of the periphery length l of the entire of the ground contact region. A periphery length lc of an outer surface of a shoulder tread rubber 7c disposed over an entire region of the shoulder region C is set within a range between 5% and 35% of the periphery length l of the entire of the ground contact region.

In this pneumatic tire for a motorcycle, each of the tread rubbers 7a to 7c disposed in each of the regions A to C has a single layered structure. Loss tangent of at least a portion forming a ground contact surface of the intermediate tread rubber 7b disposed over the entire region of the intermediate regions B is larger than both of loss tangent of at least a portion forming a ground contact surface of the central tread rubber 7a disposed over the entire region of the central region A and loss tangent of at least a portion forming a ground contact surface of the shoulder tread rubber 7c disposed over the entire region of the shoulder regions C.

Preferably, loss tangent of the shoulder tread rubber 7c is larger than loss tangent of the central tread rubber 7a.

Figure 2:
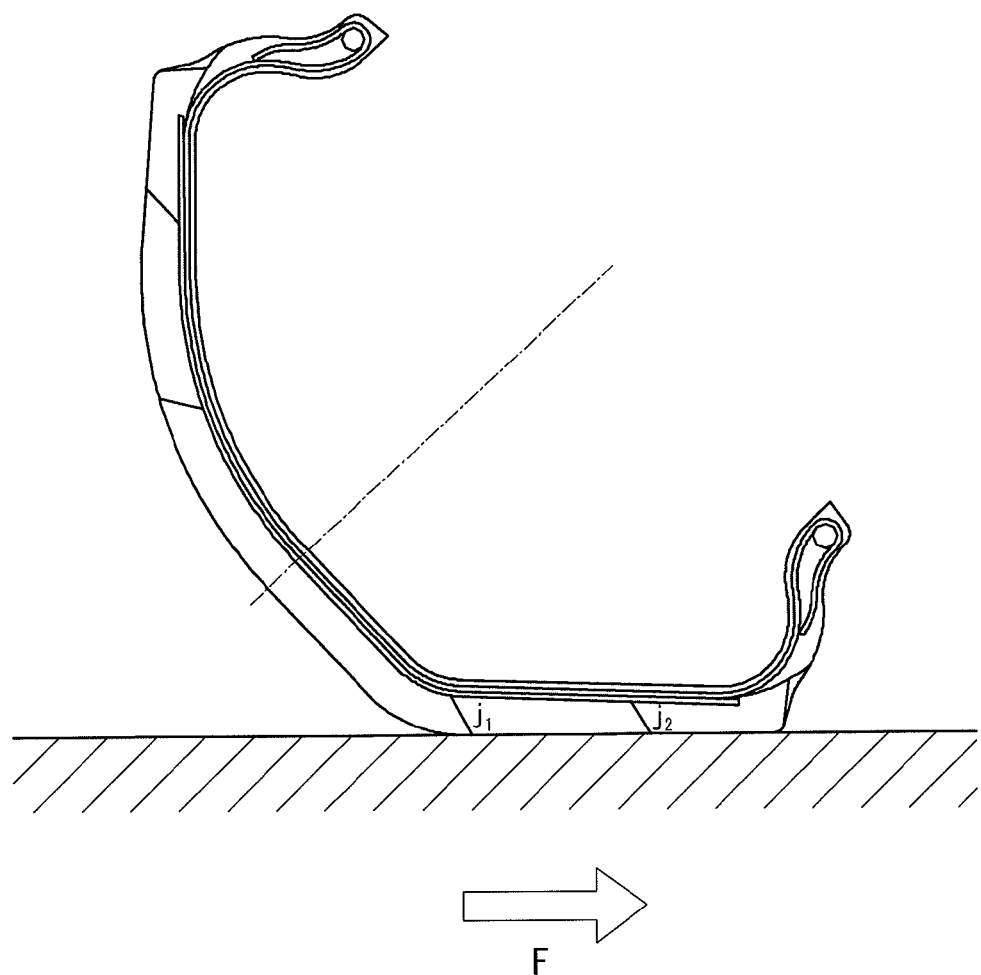
FIG. 2 is a cross-sectional view taken along a tire meridian in cornering of the tire shown in FIG. 1.

FIG. 2 is a cross-sectional view taken along a tire meridian in cornering of the tire shown in FIG. 1.

Preferably, a virtual extension of an approximate straight line j1 of a join line of the central tread rubber 7a and the intermediate tread rubber 7b extends in a direction intersecting with the tire equatorial plane in the inside of the tire and a virtual extension of an approximate straight line j2 of a join line of the intermediate tread rubber 7b and the shoulder tread rubber 7c extends in a direction intersecting with the tire equatorial plane in the inside of the tire. In addition, an intersection angle β, in the tire equatorial plane side, formed by the approximate straight line j2 of the join line of the intermediate tread rubber 7b and the shoulder tread rubber 7c and a tangent line at the join point of these tread rubbers in the ground contact surface is preferably smaller than an intersection angle α, in the tire equatorial plane side, formed by the approximate straight line j1 of the join line of the central tread rubber 7a and the intermediate tread rubber 7b and a tangent line at the join point of these tread rubbers in the ground contact surface.

According to this configuration, with respect to a lateral force F against a centrifugal force, which is applied to the shoulder tread rubber 7c contacting the ground in cornering when a camber angle is large, by setting a component of the lateral force applied in a direction to separate the join point of the intermediate tread rubber 7b and the shoulder tread rubber 7c in the ground contact surface being lower than a component of the lateral force applied in a direction to separate the join point of the central tread rubber 7a and the intermediate tread rubber 7b, it is possible to improve separation resistance.

It is preferable in such a pneumatic tire for a motorcycle that loss tangent of the shoulder tread rubber 7c is larger than loss tangent of the central tread rubber 7a so as to obtain a sufficient gripping force for a lateral force generated in cornering.

It is also preferable that loss tangent of the intermediate tread rubber 7b is within a range between 0.3 and 0.7 so as to obtain a sufficient gripping force against a road surface for each of a driving force, a braking force and a lateral force.

In case that loss tangent of the intermediate tread rubber 7b is less than 0.3, it is likely that sufficient driving and lateral forces may not be obtained due to lack of a gripping force. On the other hand, in case that it is more than 0.7, it is likely that absorption performance of vibration by irregularities of a road surface and ground contact performance may be deteriorated due to an excessively high gripping force.

It is also preferable that loss tangent of the central tread rubber 7a is within a range between 0.2 and 0.6 and loss tangent of the shoulder tread rubber 7c is within a range between 0.25 and 0.65 so as to obtain superior performance both in abrasion resistance and cornering performance.

In case that loss tangent of the central tread rubber 7a is less than 0.2, it is likely that abrasion resistance may be deteriorated due to lack of a gripping force. On the other hand, in case that it is more than 0.6, it is likely that absorption performance by irregularities of a road surface may be deteriorated due to an excessively high gripping force.

In case that loss tangent of the shoulder tread rubber 7c is less than 0.25, it is likely that a sufficient gripping force against a lateral force may not be obtained. On the other hand, in case that it is more than 0.65, it is likely that absorption performance by irregularities of a road surface may be deteriorated in cornering.

It is more preferable that the periphery length lb of the outer surface of the intermediate tread rubber 7b is within a range between 10% and 40% of the periphery length l of the entire of the ground contact region so as to secure a high forward and backward driving force and a high lateral force and to realize high driving performance, braking performance and cornering performance, respectively.

In case that the periphery length lb of the outer surface of the intermediate tread rubber 7b is less than 10% of the periphery length l of the entire of the ground contact region, it is likely that a sufficient gripping force against a driving force, a braking force and a lateral force may not be obtained. On the other hand, in case that it is more than 40%, the intermediate tread rubber 7b having high loss tangent widely spreads into the central region A or the shoulder region C, whereby each portion increases its gripping force more than required and it is likely that absorption performance by irregularities of a road surface may be deteriorated.

It is preferable that the periphery length la of the outer surface of the central tread rubber 7a is within a range between 10% and 35% of the periphery length l of the entire of the ground contact region and the periphery length lc of the outer surface of the shoulder tread rubber 7c is within a range between 5% and 35% of the periphery length l of the entire of the ground contact region so as to respectively adapt absorption performance and driving performance both in straight running and in cornering and cornering performance.

In case that the periphery length la of the outer surface of the central tread rubber 7a is less than 10% of the periphery length l of the entire of the ground contact region, it is likely that the intermediate tread rubber 7b having a high gripping force enters into the ground contact region in straight running so that a gripping force of the ground contact region in straight running becomes higher than required, which may lead to deterioration of ride comfort. On the other hand, in case that it is more than 35%, it is likely that the effect of improvement in driving performance with the increase in a gripping force of the intermediate region B may be small.

In case that the periphery length lc of the outer surface of the shoulder tread rubber 7c is less than 5% of the periphery length l of the entire of the ground contact region, it is likely that the intermediate tread rubber 7b having a high gripping force largely enters into the ground contact region in cornering so that a gripping force becomes higher than required, which may lead to deterioration of absorption performance by irregularities of a road surface and ground contact performance in cornering. On the other hand, in case that it is more than 35%, it is likely that the effect of improvement in driving performance with the increase in a gripping force of the intermediate region B may be small.

In a tire for a motorcycle, the central region A of the tread portion 1 of the tire mainly contacts the ground in straight running while the shoulder region C comes to contact the ground by shifting the ground contact region of the tire from the central region A of the tread portion 1 during running in a corner with a camber angle being applied. In comparing the frequency of straight running and running in a corner, since the frequency of straight running is much more than that of running in a corner, by disposing a rubber in the central region A, which has higher 100% modulus than that of other regions, for example, with emphasis on abrasion resistance, it is possible to extend abrasion life of the central tread rubber 7a which contacts the ground on a general road and is easily and early abraded especially.

Since a rear wheel is a drive wheel in a motorcycle, the present invention exerts great effect when applied in a tire for a rear wheel. Therefore, the side wall portion 2 preferably has a mark indicating that the tire is for a rear wheel of a motorcycle.

EXAMPLE

Next, radial tires for rear wheels are experimentally produced, each of the tires has the structure shown in FIG. 1 with a size of 190/50ZR17 and comprises a monofilament spiral belt and a nylon belt. As shown in Tables 1 and 2, Example tires 1 to 3 and Comparative Example tires 1 to 5, in which respective parameters are changed, are evaluated for their gripping force.

In the experiment a tire for a front wheel is a radial tire with a size of 120/70ZR17.

Comparative Example tires have the substantially similar structure to that of Example tire since the structure except for the rubber layers need not to be changed.

TABLE 1

|  | Periphery length la of central tread rubber (%) | Periphery length lb of intermediate tread rubber (%) | Periphery length lc of shoulder tread rubber (%) |
| --- | --- | --- | --- |
| Example tire 1 | 20 | 25 | 15 |
| Example tire 2 | 20 | 25 | 15 |
| Example tire 3 | 20 | 25 | 15 |
| Comparative Example tire 1 | 20 | 25 | 15 |
| Comparative Example tire 2 | 20 | 25 | 15 |
| Comparative Example tire 3 | 20 | 25 | 15 |
| Comparative Example tire 4 | 20 | 25 | 15 |
| Comparative Example tire 5 | 20 | 25 | 15 |

TABLE 2

|  | tanδ of central tread rubber | tanδ of intermediate tread rubber | tanδ of shoulder tread rubber |
| --- | --- | --- | --- |
| Example tire 1 | 0.30 | 0.36 | 0.32 |
| Example tire 2 | 0.30 | 0.36 | 0.30 |
| Example tire 3 | 0.32 | 0.36 | 0.30 |
| Comparative Example tire 1 | 0.32 | 0.32 | 0.32 |
| Comparative Example tire 2 | 0.36 | 0.30 | 0.30 |
| Comparative Example tire 3 | 0.36 | 0.32 | 0.30 |
| Comparative Example tire 4 | 0.30 | 0.32 | 0.36 |
| Comparative Example tire 5 | 0.32 | 0.30 | 0.36 |

(Gripping Force)

Each of Example tires 1 to 3 and Comparative Example tires 1 to 5 is mounted on a rim having a size of MT6.00 and inflated with an internal pressure of 290 kPa under a load of 150 kg and then run a lap of a circuit with a running distance of 7 km at a speed of 60 to 250 km/h to measure the lap time for gripping performance evaluation.

Results are shown in Table 3 in index values with the value of Comparative Example tire 1 being defined as 100. The larger value indicates the better result.

TABLE 3

|  | Lap time |
| --- | --- |
| Example tire 1 | 115 |
| Example tire 2 | 110 |
| Example tire 3 | 108 |
| Comparative Example tire 1 | 100 |
| Comparative Example tire 2 | 90 |
| Comparative Example tire 3 | 95 |
| Comparative Example tire 4 | 100 |
| Comparative Example tire 5 | 95 |

The results of Table 3 show that Example tires 1 to 3 exert sufficient gripping performance in comparison to Comparative Example tires 1 to 5.

DESCRIPTION OF REFERENCE NUMERALS 1 tread portion
2 side wall portion
3 bead portion
4 bead core
5 carcass ply
6 belt
7 tread rubber
7a central tread rubber
7b intermediate tread rubber
7c shoulder tread rubber
8 side rubber
A central region
B intermediate region
C shoulder region

The invention claimed is:

1. A pneumatic tire for a motorcycle comprising a tread portion comprising a tread rubber having a layered structure of one or more layers, a pair of side wall portions continuously extending from each side of the tread portion inward in a radial direction of the tire and bead portions each continuing into a radially inner side of each of the side wall portions, wherein
a ground contact region of the tread portion comprises five regions of: a central region including a tire equatorial plane; a pair of shoulder regions each including a tread ground contact end; and a pair of intermediate regions each located between the central region and each of the shoulder regions,
loss tangent of at least a portion forming a ground contact surface of an intermediate tread rubber disposed over an entire region of the intermediate regions is larger than both of loss tangent of at least a portion forming a ground contact surface of a central tread rubber disposed over an entire region of the central region and loss tangent of at least a portion forming a ground contact surface of a shoulder tread rubber disposed over an entire region of the shoulder regions,
an intersection angle β, in a tire equatorial plane side, formed by an approximate straight line of a join line of the intermediate tread rubber and the shoulder tread rubber and a tangent line at a join point of the intermediate tread rubber and the shoulder tread rubber in a ground contact surface is smaller than an intersection angle α, in a tire equatorial plane side, formed by an approximate straight line of a join line of the central tread rubber and the intermediate tread rubber and a tangent line at a join point of the central tread rubber and the intermediate tread rubber in a ground contact surface, and
the join lines between the respective regions are the only join lines.

2. The pneumatic tire for a motorcycle according to claim 1, wherein
loss tangent of the shoulder tread rubber is larger than loss tangent of the central tread rubber.

3. The pneumatic tire for a motorcycle according to claim 1, wherein
loss tangent of the central tread rubber is within a range between 0.2 and 0.6 and
loss tangent of the shoulder tread rubber is within a range between 0.25 and 0.65.

4. The pneumatic tire for a motorcycle according to claim 1, wherein,
in a cross-sectional view taken along a tire meridian, a periphery length of an outer surface of the intermediate tread rubber is within a range between 10% and 40% of a periphery length of an entire of the ground contact region.

5. The pneumatic tire for a motorcycle according to claim 1, wherein,
in a cross-sectional view taken along a tire meridian,
a periphery length of an outer surface of the central tread rubber is within a range between 10% and 35% of a periphery length of an entire of the ground contact region and
a periphery length of an outer surface of the shoulder tread rubber is within a range between 5% and 35% of the periphery length of the entire of the ground contact region.

6. A motorcycle, comprising:
a rear wheel, and
the pneumatic tire according to claim 1, wherein
the tire is to be mounted on the rear wheel of the motorcycle.

* * * * *